United States Patent
Adams et al.

(10) Patent No.: US 8,578,169 B2
(45) Date of Patent: Nov. 5, 2013

(54) SYSTEM AND METHOD OF SIGNING A MESSAGE

(75) Inventors: Neil Patrick Adams, Waterloo (CA); Ravi Singh, Toronto (CA); Nikhil Vats, Vaughn (CA); Alexander Sherkin, Woodbridge (CA)

(73) Assignee: Blackberry Limited, Waterloo (CA)

( * ) Notice: Subject to any disclaimer, the term of this patent is extended or adjusted under 35 U.S.C. 154(b) by 42 days.

(21) Appl. No.: 13/246,983

(22) Filed: Sep. 28, 2011

(65) Prior Publication Data

US 2012/0260097 A1 Oct. 11, 2012

Related U.S. Application Data

(60) Provisional application No. 61/417,541, filed on Nov. 29, 2010.

(51) Int. Cl.
H04L 29/06 (2006.01)

(52) U.S. Cl.
USPC .......................................... 713/176; 713/181

(58) Field of Classification Search
USPC .................................................. 713/176, 181
See application file for complete search history.

(56) References Cited

U.S. PATENT DOCUMENTS

| | | | | |
|---|---|---|---|---|
| 5,465,299 A | * | 11/1995 | Matsumoto et al. | 713/176 |
| 8,185,741 B1 | * | 5/2012 | Agrawal et al. | 713/176 |
| 2002/0108044 A1 | * | 8/2002 | Miyazaki et al. | 713/180 |
| 2005/0071508 A1 | * | 3/2005 | Brown et al. | 709/246 |
| 2006/0190545 A1 | * | 8/2006 | Banerjee et al. | 709/206 |
| 2009/0307490 A1 | * | 12/2009 | Dancer | 713/168 |
| 2010/0100465 A1 | * | 4/2010 | Cooke et al. | 705/34 |

OTHER PUBLICATIONS

Secure/Multipurpose Internet Mail Extensions (S/MIME) Version 3.2 Message Specification; Ramsdell & Turner; Standards Track; Jan. 2010.

* cited by examiner

*Primary Examiner* — Hadi Armouche
*Assistant Examiner* — Christopher C Harris
(74) *Attorney, Agent, or Firm* — Ridout & Maybee LLP

(57) ABSTRACT

A system and method of signing a message to be sent from a first communication device to a destination via a second communication device. The message includes a first portion on the first communication device and a second portion on the second communication device. The method includes receiving at the second communication device the first portion of the message and a first signature for the first portion from the first communication device; combining the first portion and the second portion to form the message; obtaining a second signature for the message; and sending the first signature, the second signature and the message from the second communication device to the destination.

14 Claims, 6 Drawing Sheets

SYSTEM AND METHOD OF SIGNING A MESSAGE

CROSS-REFERENCE TO RELATED APPLICATIONS

The present application claims the benefit of priority to U.S. Application No. 61/417,541 filed Nov. 29, 2010, the contents of which are hereby incorporated herein by reference.

TECHNICAL FIELD

Example embodiments relate to the field of secure messaging, and more specifically to the field of secure messaging on communication devices.

BACKGROUND

Digital cryptographic signatures, which may be herein referred to as digital signatures, may often be used in messaging systems to provide security features including authentication of the source of the message, message integrity, and non-repudiation of origin. In messaging systems where a message originating from a communication device passes through a server or another communication device, there may be situations in which the server may add to the message. For example, the server may add text or attachments. Some devices may wish to digitally sign the sent message. However, in order to do so, some conventional systems may provide incomplete authentication since the communication device may be signing a message that has been subsequently changed by the server to add the text or attachments. Other difficulties with existing systems may be appreciated in view of the detailed description below.

BRIEF DESCRIPTION OF THE DRAWINGS

Embodiments will now be described, by way of example only, with reference to the attached figures, wherein.

Like reference numerals are used throughout the figures to denote similar elements and features.

DETAILED DESCRIPTION OF EXAMPLE EMBODIMENTS

Figure 1:
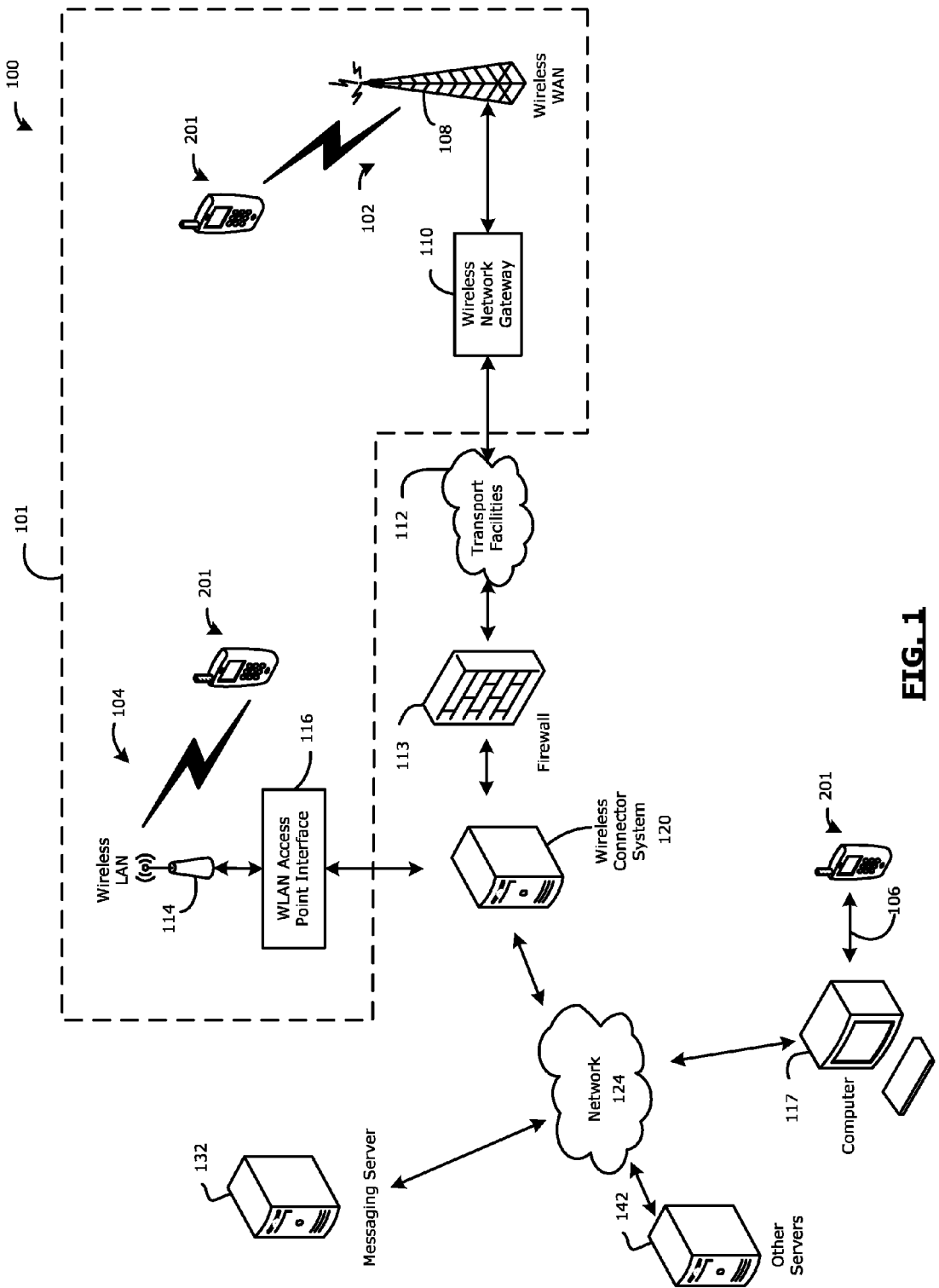
FIG. 1 is a block diagram of a communications system to which embodiments may be applied.

It would be advantageous to provide for an improved process for signing messages.

In accordance with one aspect, there is provided a method of signing a message to be sent from a first communication device to a destination via a second communication device. The message includes a first portion on the first communication device and a second portion on the second communication device. The method includes receiving at the second communication device the first portion of the message and a first signature for the first portion from the first communication device; combining the first portion and the second portion to form the message; obtaining a second signature for the message; and sending the first signature, the second signature and the message from the second communication device to the destination.

In accordance with another aspect, there is provided a method of signing a message to be sent from a first communication device to a destination via a second communication device. The message includes a first portion on the first communication device and a second portion on the second communication device. The method includes generating a first signature for the first portion of the message on the first communication device; and sending the first signature and the first portion of the message to the second communication device.

In another aspect, there is provided a server for signing a message to be sent from a communication device to a destination via the server. The message includes a first portion and a second portion. The server includes a processor; memory; and a communication subsystem for sending and receiving communications with the communication device and the destination. The processor is configured to receive the first portion of the message and a first signature for the first portion from the communication device, combine the first portion of the message with the second portion of the message, the second portion being stored on the memory, obtain a second signature for the message, and send the first signature, the second signature and the message to the destination.

In yet another aspect, there is provided a communication device for signing a message to be sent from the communication device to a destination via a server. The message includes a first portion and a second portion. The communication device includes a processor; a memory; and a communication subsystem for sending and receiving communications with the server. The processor is configured to generate a first signature for the first portion, the first portion being stored on the memory, and send the first signature and the first portion of the message to the server.

Messaging applications, such as an email client, are typically used to manage a user's messages and to facilitate the sending and receiving of messages via a messaging server. Incoming messages are generally received at and stored on the server, and the messaging application connects to the server to access or download the incoming messages. Outgoing messages are generally composed on the communication device and are sent to the server where they may be stored before being sent on to the destination. Both incoming and outgoing message may include text and attached data or file attachments such as images, documents, presentation files and other user data.

In example embodiments, the term "message" may be understood to include both the text and any attachments or attached data. Also, while some of the following examples are discussed in the context of email messaging, some example embodiments are not necessarily limited to email messages and may be applicable more broadly to any messaging system wherein messages are sent from a communication device to a remote destination via a server.

Most messaging applications allow a user to reply to an incoming message or forward an incoming message to another destination. In additional to any new text or attachments provided by a user, these forwarded or reply messages may include the text of the original incoming message and/or any attachments in the original incoming messages.

In some messaging applications, messages may be digitally signed to provide sender authentication, message integrity, or non-repudiation. A digital signature may be generated by the message sender by applying the sender's private cryptographic key and a cryptographic algorithm to the message. Upon receipt, the recipient may decrypt the digital signature using the sender's public cryptographic key, and compare it to the message. Since the digital signature can only be produced by the sender's private cryptographic key, the recipient may be reassured of the sender's authenticity, the message integrity, or may use the signature to prevent repudiation of the message.

In some examples, a hash or message digest may be generated from the message before applying the cryptographic algorithm. Generating or verifying a signature for the shortened hash is generally less computationally intensive than it is for the entire message. In the following description, the phrase "generating a signature" or similar language contemplates both the scenario where a signature is generated from the hash of a message, and the scenario where a signature is generated from the message itself.

The digital signature may be generated using any algorithm including but not limited to the Digital Signature Algorithm (DSA); Elliptic Curve DSA; and the Rivest, Shamir, Adleman (RSA) algorithm. For further security, the sender may use a third-party certificate authority to certify ownership of the public key.

In some examples, the message may also be encrypted by the sender to prevent unauthorized access to the message.

In accordance with some example embodiments, in some messaging systems, portions of a message to be sent to a destination may be stored on the server and may or may not be stored on the communication device. In these systems, when the communication device replies to or forwards a message for which portions are stored on the server, the communication device may reduce data transmission costs by only sending the portions of the message which are not stored on the server. In some examples, the communication device may not be required to store or to even have received the portions stored on the server.

In the following description, many of the described embodiments involve communication devices communicating with a server over a wireless network. However, some example embodiments may not be necessarily limited to communication devices and wireless communications and may be applicable more broadly to any communications device configured to send messages to a remote destination via a server.

Reference is made to FIG. 1, which shows, in block diagram form, an example communication system 100. The communication system 100 includes a number of mobile communication devices 201, which may be connected to the remainder of system 100 in any of several different ways. For illustrative purposes, two instances of communication devices 201 are depicted in FIG. 1 each employing different example ways of connecting to system 100. Communication devices 201 are connected to a wireless communication network 101, which may comprise one or more of a Wireless Wide Area Network (WWAN) 102, a Wireless Local Area Network (WLAN) 104, or any other suitable network arrangements. In some embodiments, the communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of base stations 108 (one of which is shown in FIG. 1), each containing radio transmitting and receiving equipment adapted to provide wireless radio-frequency (RF) network service or "coverage" to a corresponding area or cell. The WWAN 102 is typically operated by a mobile network service provider that provides subscription packages to users of the mobile communication devices 201. The WWAN 102 may be implemented as any appropriate wireless network, including, but not limited to, any to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"). Other network types and technologies could also be used. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

A wireless network gateway 110 may be associated with the WWAN 102 to connect the communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the communication devices 201 and other devices (not shown) connected, directly or indirectly, to the WWAN 102. Accordingly, communications sent via the communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the communication devices 201.

The WLAN 104 comprises a wireless network which, in some embodiments, conforms to IEEE 802.11x standards (sometimes referred to as Wi-Fi) such as, for example, any or all of the IEEE 802.11a, 802.11b, 802.11g, or 802.11n standards. Other communication protocols may be used for the WLAN 104 in other embodiments such as, for example, IEEE 802.16e (also referred to as Worldwide Interoperability for Microwave Access or "WIMAX"), or IEEE 802.20 (also referred to as Mobile Wireless Broadband Access). The WLAN 104 includes one or more wireless RF Access Points (AP) 114 (one of which is shown in FIG. 1) that collectively provide WLAN service or coverage over an area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116, which may connect to the wireless connector system 120 directly (for example, if the access point 114 is part of an enterprise WLAN 104 in which the wireless connector system 120 resides), or indirectly (not shown) via the transport facilities 112 if the access point 14 is a personal Wi-Fi network or Wi-Fi hotspot (in which case, a mechanism for securely connecting to the wireless connector system 120, such as a virtual private network (VPN), may be desirable). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including e-mail messages, to and from a set of managed communication devices 201. The wireless connector system 120 also provides administrative control and management capabilities over users and communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) or other servers 142. For example, other server 142 may include both content servers for providing content such as internet content or content from an organization's internal servers, as well as servers for implementing server-based applications such as instant messaging (IM) applications.

In FIG. 1, the messaging server 132 and other servers 142 appear separately from the wireless connector system 120; however, in other examples, the messaging server 132 or other servers 142 may be at the same location as the wireless connector system 120.

The wireless connector system 120 typically provides a secure exchange of data (e.g., e-mail messages, personal information manager (PIM) data, and IM data) with the communication devices 201. In some embodiments, communications between the wireless connector system 120 and the communication devices 201 are encrypted.

The wireless network gateway 110 is adapted to send data packets received from the communication device 201 over the WWAN 102 to the wireless connector system 120. The wireless connector system 120 then sends the data packets to the appropriate connection via a proxy server, or directly to a server such as a messaging 132 or other 142 server. Conversely, the wireless connector system 120 sends data packets received, for example, from a server 132, 142 to the wireless network gateway 110 which then transmits the data packets to the destination communication device 201. The AP interfaces 116 of the WLAN 104 provide similar sending functions between the communication device 201, the wireless connector system 120 and network connection point such as the messaging 132 or other servers 142.

The messaging 132 or other servers 142 may be configured to receive messages from a communication device 201 and send them to the proper destination via the network 124. In some examples, the server 132, 142 may receive a first portion of the message from the communication device 201 and combine it with the second portion of the message stored on the server 132, 142 before sending the combined message to its destination.

The network 124 may comprise a private local area network, metropolitan area network, wide area network, the public internet or combinations thereof and may include virtual networks constructed using any of these, alone, or in combination. A communication device 201 may alternatively connect to the wireless connector system 120 using a computer 117, such as desktop or notebook computer, via the network 124. A link 106 may be provided for exchanging information between the communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system 100 is provided for the purpose of illustration only, and that the above-described communication system 100 comprises one possible communication network configuration of a multitude of possible configurations for use with the communication devices 201. Some example embodiments may be employed in connection with any other type of network and associated devices that are effective in implementing or facilitating wireless communication. Suitable variations of the communication system are intended to fall within the scope of example embodiments.

Figure 2:
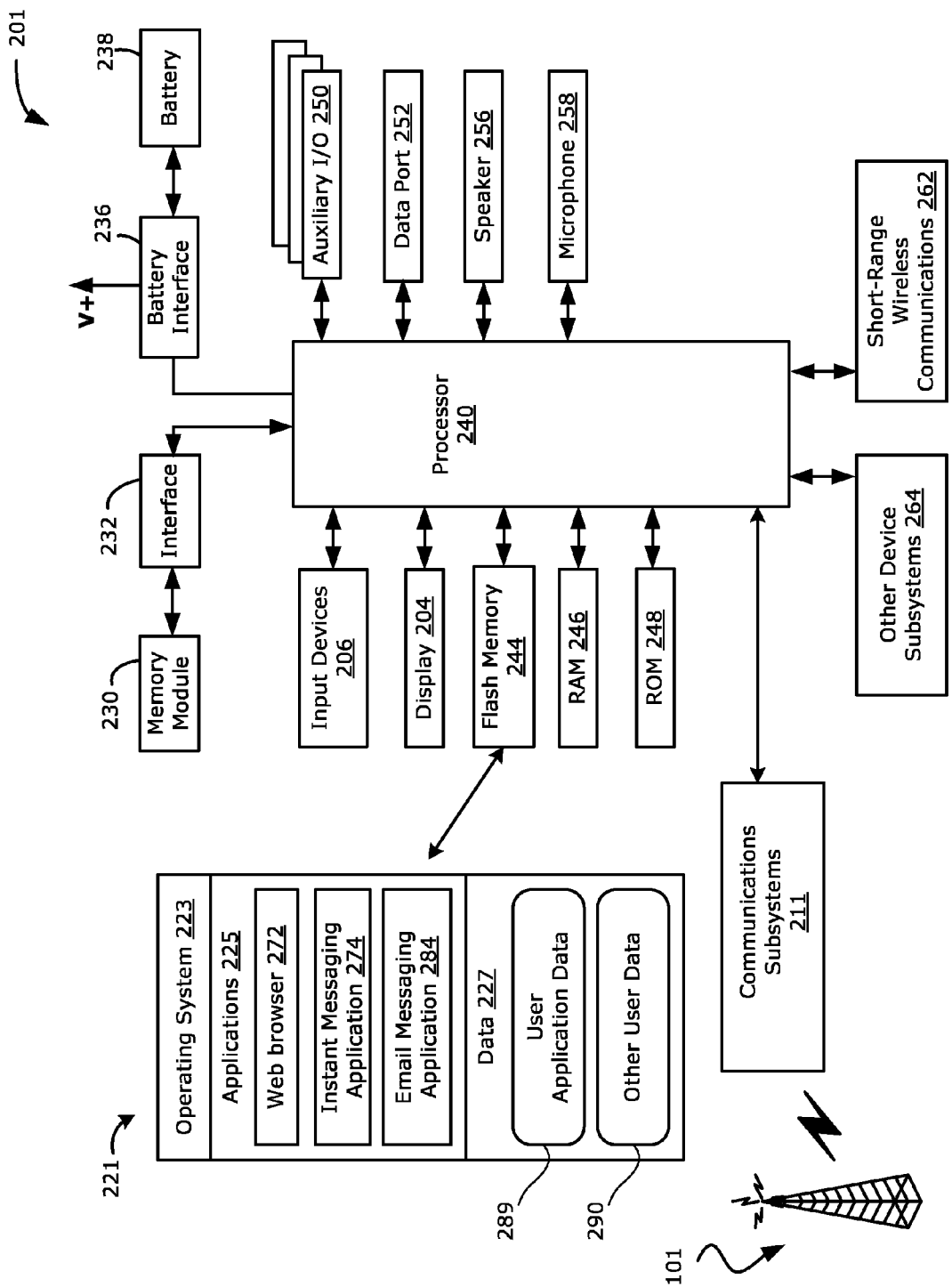
FIG. 2 is a block diagram showing an example embodiment of a communication device that can be used in the communications system of FIG. 1.

Reference is now made to FIG. 2 which illustrates a mobile device 201 in which example embodiments can be applied. The mobile communication device 201 is a two-way communication device having data and voice communication capabilities, and the capability to communicate with other computer systems, for example, via the Internet. Depending on the functionality provided by the communication device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The communication device 201 includes a rigid case (not shown) housing the components of the device 201. The internal components of the device 201 are constructed on a printed circuit board (PCB). The communication device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication device 201 may communicate with any one of a plurality of fixed transceiver base stations 108 (FIG. 1) of the wireless network 101 within its geographic coverage area. The communication device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223 and software applications 225, which may include a web browser 272, an instant messaging application 274, and an email messaging application 284. In some example embodiments, the functions performed by each of the applications 272, 274, and 284 may each be realized as a plurality of independent elements, and any one or more of these elements may be implemented as parts of other software applications 225. In some example embodiments, one or more applications 225 are configured to send messages to a user defined destination via a messaging 132 or other server 142.

In some examples, the software modules 221 may be configured to send messages to a destination when one portion of the message is on the communication device 201 and another portion is on a server 132, 142. In some examples, the software modules 221 may be configured to digitally sign messages or portions of messages.

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

In some embodiments, the auxiliary input/output (I/O) subsystems 250 may comprise an external communication link or interface, for example, an Ethernet connection. The communication device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the communication device 201 also includes a removable memory card 230 (typically comprising flash memory) and a memory card interface 232. Network access typically associated with a subscriber or user of the communication device 201 via the memory card 230, which may be a Subscriber Identity Module (SIM) card for use in a GSM network or other type of memory card for use in the relevant wireless network type. The memory card 230 is inserted in or connected to the memory card interface 232 of the communication device 201 in order to operate in conjunction with the wireless network 101.

The communication device 201 also stores other data 227 in an erasable persistent memory, which in one example embodiment is the flash memory 244. In various embodiments, the data 227 includes service data comprising information required by the communication device 201 to establish and maintain communication with the wireless network 101. The data 227 may also include user application data 289 such as email messages, address book and contact information, calendar and schedule information, notepad documents, image files, and other commonly stored user information stored on the communication device 201 by its user, and other data 290. The data 227 stored in the persistent memory (e.g. flash memory 244) of the communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the communication device 201 by providing for information or software downloads to the communication device 201 other than through the wireless network 101. The alternate download path may, for example, be used to load an encryption key onto the communication device 201 through a direct, reliable and trusted connection to thereby provide secure device communication.

In some embodiments, the communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their communication device 201 to the host computer system via a USB cable or Bluetooth® connection, traffic that was destined for the wireless network 101 is automatically routed to the communication device 201 using the USB cable or Bluetooth® connection. Similarly, any traffic destined for the wireless network 101 is automatically sent over the USB cable Bluetooth® connection to the host computer system for processing.

The communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the communication device 201, and the battery interface 236 provides a mechanical and electrical connection for the battery 238. The battery interface 236 is coupled to a regulator (not shown) which provides power V+ to the circuitry of the communication device 201.

The short-range communication subsystem 262 is an additional optional component which provides for communication between the communication device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the communication device 201 during or after manufacture. Additional applications and/or upgrades to the operating system 223 or software applications 225 may also be loaded onto the communication device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the communication device 201 and may provide enhanced on-device functions, communication-related functions, or both. For example, secure communication applications may enable electronic commerce functions and other such financial transactions to be performed using the communication device 201.

The communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the communication device 201 may also compose data items, such as email messages, for example, using the input devices in conjunction with the display screen 204. These composed items may be transmitted through the communication subsystem 211 over the wireless network 101.

In the voice communication mode, the communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the communication device 201. Although voice or audio signal output is typically accomplished primarily through the speaker 256, the display screen 204 may also be used to provide an indication of the identity of a calling party, duration of a voice call, or other voice call related information.

While the above examples describe communication devices in the context of mobile communications, the term communication device may include wireless and wired communication devices such as for example servers, laptops, tablets, and desktop computers. The following description of example embodiments may refer specifically to a communication device and a server. It will be appreciated that in some instances the server may also be referred to as 'another communication device' or a 'second communication device'.

Figure 3:
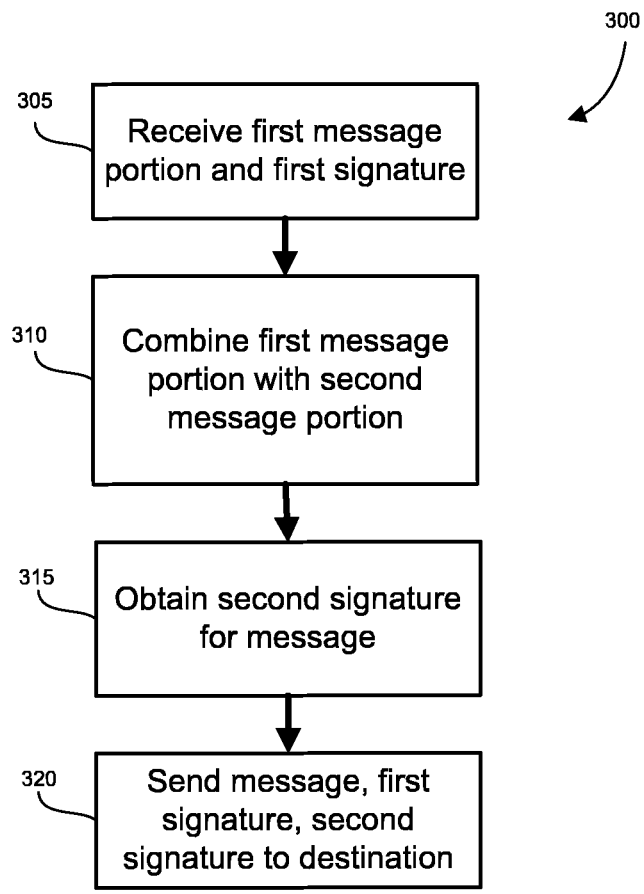
FIG. 3 shows, in flowchart form, an example method of signing a message.

Reference is now made to FIG. 3, which shows, in flowchart form, a method 300 of signing a message to be sent from a communication device to a destination via a server.

The method 300 begins with a receipt of a first portion of a message and a signature for the first portion, at event 305. The first portion and signature are received at a server from a communication device. The message is directed to a remote destination, which may in some examples include a messaging server, an email address, an internet protocol (IP) address, any other server or a second communication device.

Messages may be sent and received using a standard or proprietary protocol. For example, if the message is an email message, the message may comply with Post Office Protocol (POP), Simple Mail Transfer Protocol (SMTP), or Internet Message Access Protocol (IMAP).

The first portion of the message received by the server may include text, attachments or other data input or selected on the communication device. The text, attachments and other data of a message will be referred to herein as the content of the message. The first portion may also include one or more indicators or pointers to indicate that a portion of the message to be sent to the destination is stored on the server. These indicators may be pointers, links, or other identifiers for referencing text, data or files stored on the server that are to be included in the message.

The first portion may also include sender and destination information such as email addresses, as well as other message information such as timestamps, route information, message format, and type of content. In some examples, this message information may be stored in a header section of the message.

The message may also be composed in a standard format such as Multipurpose Internet Mail Extensions (MIME). In some examples, the content and signature of the first portion may be received in a combined structure such as that defined by the MIME standard.

The signature for the first portion may have been generated on the communication device using any cryptographic algorithm as discussed above. In some examples, the signature may be generated using standard encryption and digital signature software/systems such as Pretty Good Privacy (PGP) or Secure/Multipurpose Internet Mail Extensions (S/MIME). In some examples, the first portion of the message may also be encrypted for further security.

After receiving the first portion of the message and the first signature, the server, at event 310, combines the first portion with a second portion of the message. The second portion may include text, data and/or attachments, residing on the server that were not included in the first portion received from the communication device. In some examples, the content of the second portion may be identified by the indicators or pointers included with the first portion of the message.

The combination of the first portion and the second portion forms the complete message to be sent to the destination. In some examples, the complete message is combined by nesting the first portion including the first signature within the complete message. That is, the complete message may include the first signature within it. In some such examples, the nesting can be performed by including an inner S/MIME message containing the first portion within an outer S/MIME message. The outer S/MIME message would then contain both the inner S/MIME message and the second portion. In some examples, the nesting can be performed by including the content and signature of the first portion as attachments to the complete message. In some examples, this nesting may comply with non-standard or future S/MIME formatting specifications.

In some nested S/MIME formatting specifications, attachments may not be added to anything but the inner-most layer of a nested S/MIME message. To comply with these specifications, in some examples, the first portion S/MIME message is treated as an attachment to an outer S/MIME message. In these examples, the outer S/MIME message will contain the second portion including any second portion text, data or attachment, as well as the first portion S/MIME message as an additional attachment. In these examples, the attachment containing the first portion S/MIME message may have to be manually opened on the recipient's messaging application before the first portion contents may be accessed.

In some examples, the recipient's messaging application may be configured to automatically render the first portion S/MIME message contained within the attachment. In these examples, the messaging application may be configured to indicate which signature covers the different portions of the message.

In other examples, the recipient's messaging application may be configured to open the inner S/MIME message containing the first portion as a new message. The recipient's messaging application may also be configured to indicate in a new field that the inner message is contained within another message.

In other examples, to comply with the nested S/MIME formatting specifications, the inner message containing the first portion and nested within the outer S/MIME message may be signed with PGP instead of S/MIME.

In other examples, the complete message may be created by combining both the first and second portion in a single-layer or flat format. That is, the complete message includes the first and second portion, but does not include the first signature within it; rather, the first signature is appended or attached to the complete message. With such a single-layer or flat structure, the complete message may have to include an indication of which portion of the message is associated with the first signature.

At event 315, a second signature for the complete message is obtained. Examples illustrating this event are described herein with reference to FIGS. 4 and 5. It will be understood that the complete message signed by the second signature may include the first signature within it in some embodiments, and may exclude the first signature in some embodiments.

In some examples, the complete message is encrypted before the second signature is obtained at event 315. In one example, where the first portion is already encrypted when it is received at event 305, the server may decrypt the first portion and then re-encrypt the complete message. In another example, the server may encrypt the second portion together with the encrypted first portion (i.e. the first portion will be encrypted twice). In yet another example, the server may encrypt the second portion separately from the first portion.

At event 320, the contents of the complete message, the first signature (either inside the message or attached to it) and the second signature are sent from the server to the destination via the network 124. Similar to the first message portion received in event 305, the complete message and the first and second signatures may be sent using a messaging or internet protocol, and the message format may conform to a standard such as MIME or S/MIME. In some examples, the first portion and first signature are nested within the complete message. In some examples, the second signature and the contents of the complete message are sent in a combined structure such as that defined by the MIME standard. In other examples, the signatures may be sent in separate structures from the contents of the message.

In some examples, the cryptographic keys used to generate the first and second signatures are associated with public key certificates. If these certificates are issued to different identities and are named appropriately, the recipient may use this information to understand the security implications of each signature as described below.

In method 300, it may be appreciated that the first and second signatures which were sent to the destination could allow the recipient of the message to separately verify the authenticity and integrity of the first portion and of the complete message. The first signature verifies the text and attachments sent from the communication device, and the second signature can verify combination of the text and attachments sent from the server.

Figure 4:
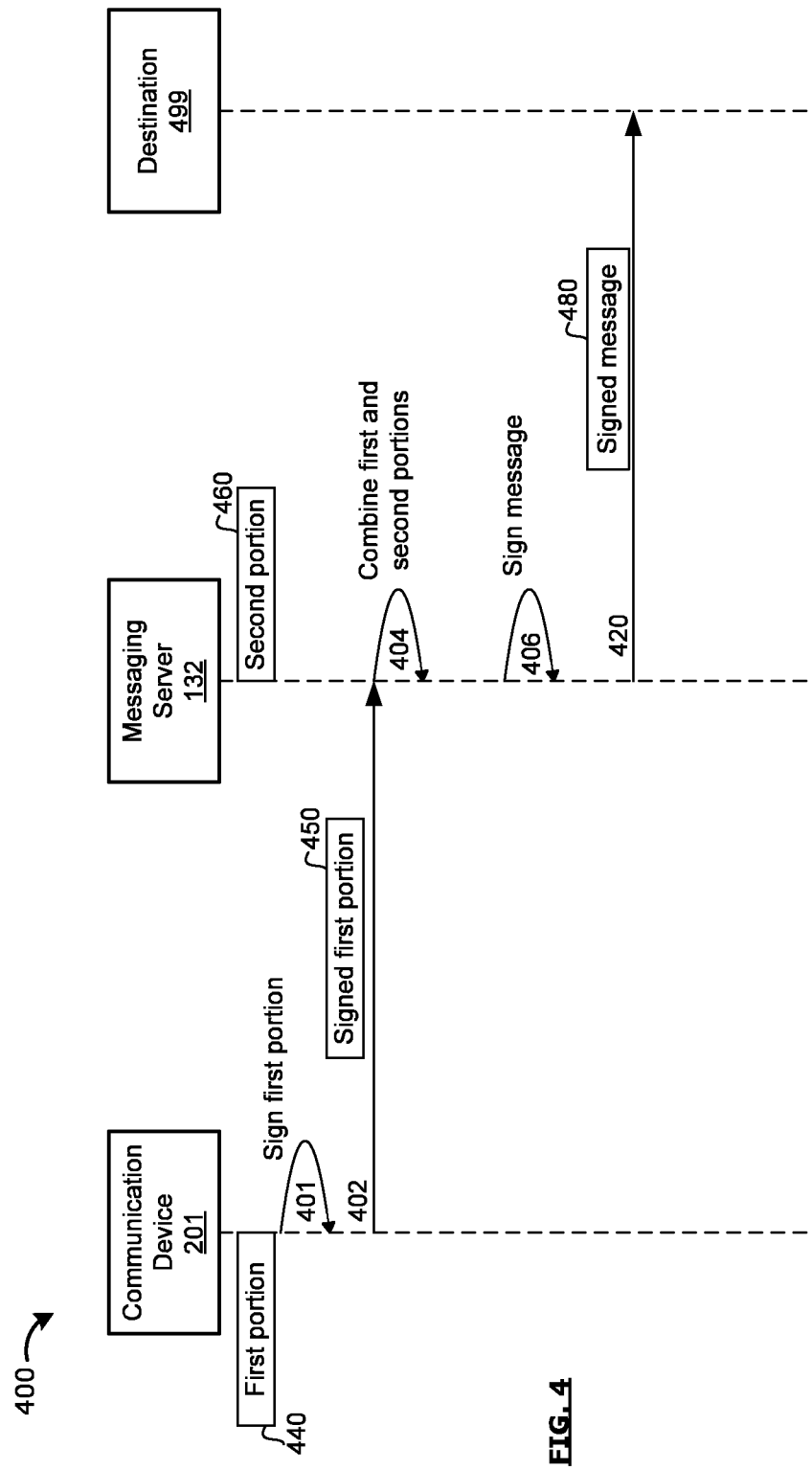
FIG. 4 is a flowchart illustrating a communication between a communication device, a messaging server and a destination.

FIG. 4 shows an example signalling diagram illustrating communications 400 between a communication device 201 and a messaging server 132 in accordance with one example embodiment. In this example, the communication device 201 is running an email messaging application 284, and the communication device 201 is used to forward an email message to an email address. The original email message contains an attached image file and a brief text description of the image and was received on the communication device 201 via the messaging server 132. A copy of the original email message is stored on the messaging server 132. In the forwarding email, the user inputs text comments on the communication device 201 regarding the image and sends the forwarding email to the email address.

In this example, the text comments input by the user form the first portion of the message 440, and the original text description and image attachment form the second portion 450. The email address resolves to the destination 499 of the message. Since the second portion of the message 460 is already on the server 132, the communication device 201 does not have to send the original text description and image attachment to the server. Instead, the communication device 201 includes pointers indicating that the original text description and image attachment stored on the server are to be included in the message.

At event 401, the communication device 201 digitally signs the first portion 440 by generating a first signature for the first portion 440 using a first cryptographic key stored on the communication device. In some embodiments, the pointers or indicators are included in the generation of the first signature, while in other embodiments, the pointers or indicators are not included with the first portion when generating the first signature.

At event 402, the signed first portion 450, which includes the user's text comments, the pointers and the first signature, is sent to the messaging server 132.

Upon receipt of the signed first portion 450, the messaging server 132 recognizes the pointers as identifying the content of the second portion 460 stored on the server, and at event 404, combines the signed first portion 450 and the second portion 460 to form the complete message.

At event 406, the messaging server generates a second signature for the complete message using a second cryptographic key stored on the messaging server 132. In this example, event 406 corresponds to the obtaining a second signature event 315 in FIG. 3.

At event 420, the messaging server sends the signed message 480, comprising the contents of the first and second portions and the first and second signatures, through the network 124 to the destination 499.

In the example illustrated by FIG. 4, if the first cryptographic key on the communication device 201, and the second cryptographic key on the messaging server 132 are associated with certificate authorities and are appropriately named, the recipient of the message will be able to certify that the first portion of the message was sent by the communication device, and that the combined message was sent by the server associated with the user's email account. With this information, the recipient may be able to associate the amount of trust he has in the user and in the server with the corresponding portions of the message.

Figure 5:
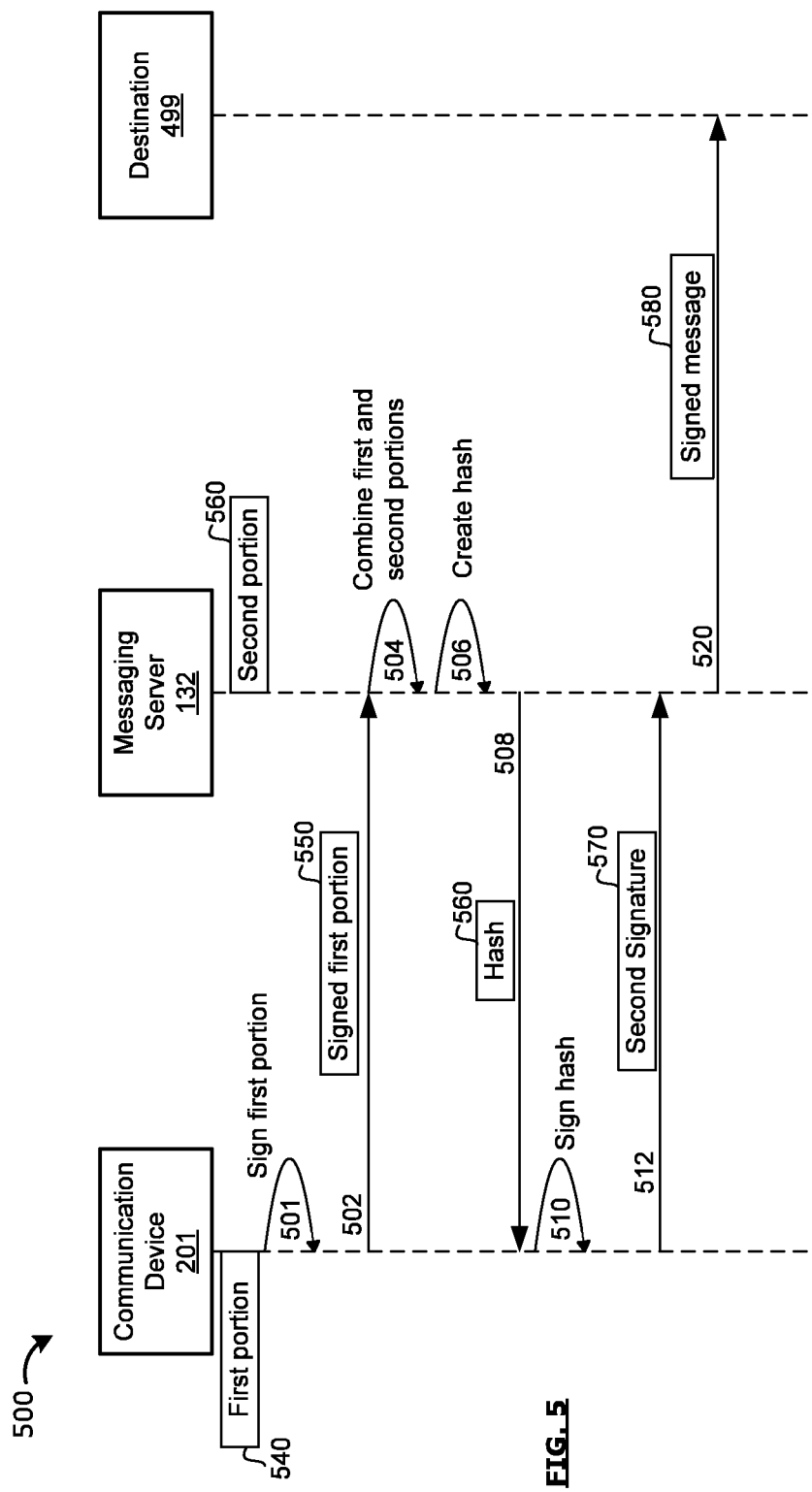
FIG. 5 is a flowcharts illustrating a communication between a communication device, a messaging server and a destination.

FIG. 5 shows another example signalling diagram illustrating communications 500 between a communication device 201 and a messaging server 132 in accordance with another example embodiment. In FIG. 5, a similar example scenario as in FIG. 4 is illustrated with a user forwarding a message from a communication device 201 to a destination 499 wherein a first portion 540 of the message is on the communication device 201 and a second portion 560 of the message is on the messaging server 132.

In this example, events 501, 502, 504, and 520 are similar to events 401, 402, 404 and 420, respectively as described above having regard to FIG. 4.

In this example, the text comments input by the user form the first portion of the message 540, and the original text description and image attachment form the second portion 550. The email address resolves to the destination 499 of the message. Since the second portion of the message 560 is already on the server 132, the communication device 201 does not have to send the original text description and image attachment to the server. Instead, the communication device 201 includes pointers indicating that the original text description and image attachment stored on the server are to be included in the message.

At event 501, the communication device 201 digitally signs the first portion 540 by generating a first signature for the first portion 540 using a first cryptographic key stored on the communication device. In some embodiments, the pointers or indicators are included in the generation of the first signature, while in other embodiments, the pointers or indicators are not included with the first portion when generating the first signature.

At event 502, the signed first portion 550, which includes the user's text comments, the pointers and the first signature, is sent to the messaging server 132.

Upon receipt of the signed first portion 550, the messaging server 132 recognizes the pointers as identifying the content of the second portion 560 stored on the server, and at event 504, combines the signed first portion 550 and the second portion 560 to form the complete message.

At event 506, the messaging server 132 generates a hash of the combined message. In some embodiments, the hash function includes the first signature as part of the combined message, while in other embodiments, the hash is generated from the combined message not including the first signature. The hash may be generated using any hashing algorithm such as Message-Digest algorithm 5 (MD5) or variants of the Secure Hash Algorithm (SHA).

At event 508, the messaging server 132 sends the hash 560 to the communication device 201. At event 510, the communication device generates the second signature 570 from the hash 560 using a cryptographic key. In some embodiments, the cryptographic key used to generate the second signature is different than the key used to generate the first signature.

At event 512, the communication device sends the second signature 570 to the messaging server 132.

In this example, the obtaining a second signature event 315 in FIG. 3 corresponds to events 506, 508 and 512, namely generating the hash 560 of the first and second portions, sending the hash 560 to the communication device 201 and receiving the second signature 570 from the communication device 201.

At event 520, the messaging server sends the signed message 580, comprising the contents of the first and second portions and the first and second signatures, through the network 124 to the destination 499.

In the example illustrated by FIG. 5, if the two cryptographic keys on the communication device 201 are associated with a certificate authority and are appropriately named, the recipient of the message will be able to certify that the first portion of the message was sent by the user on the communication device, and that the combined message was sent by the server associated with the user's email account. With this information, the recipient may be able to associate the amount of trust he has in the user and in the server with the corresponding portions of the message.

In some of the examples described above, the first portion and the complete message may be sent in an S/MIME message format or another message format that allows attributes to be added to the first and second signatures. In these examples, the attributes may be used to provide additional information regarding the signatures. For example, the first signature may include an attribute or indication that it is weakly signed because the sender only has control of the first portion of the message on the communication device 201. As illustrated in the examples of FIGS. 4 and 5, the sender must trust that the messaging server 132 combines the second portion 460 with the first portion 440. The example illustrated in FIG. 5, further requires the sender to trust that the messaging server 132 properly computes the hash of the combined message.

By including both the first and second signatures with the message, the sender provides to the recipient a more precise understanding of the authenticity and integrity of the first and second portions of the message.

Figure 6:
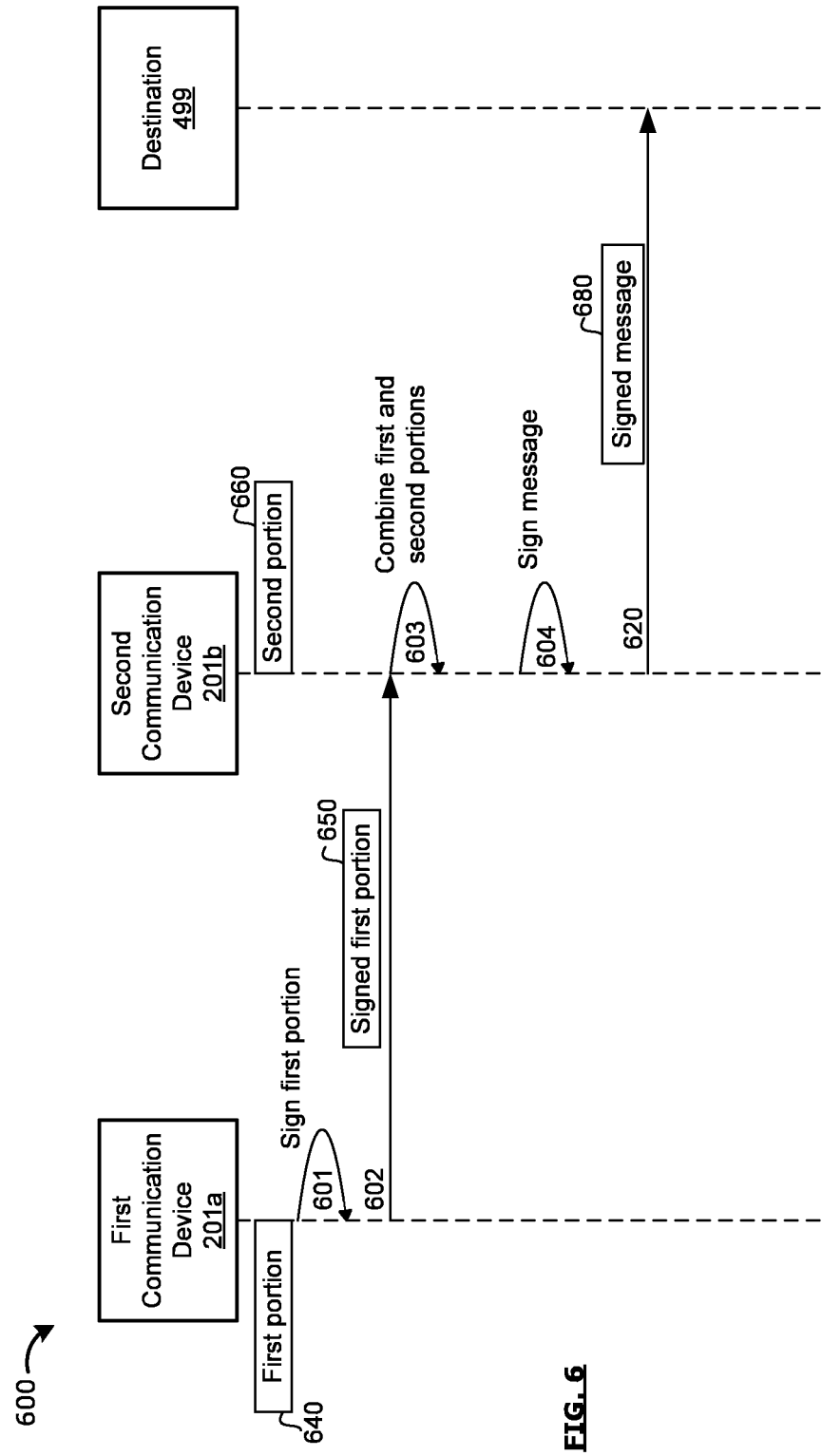
FIG. 6 is a flowchart illustrating a communication between two communication devices and a destination.

FIG. 6 shows another example signalling diagram illustrating communications 600 between two communication devices 201*a*, 201*b* and a destination 499 in accordance with another example embodiment. In the example illustrated in FIG. 6, the user of the first communication device 201*a* is e.g. a manager, the user of the second communication device 201*b* is e.g. an employee, and the destination 499 is e.g. an accounting department. In the example shown, the second device communication device 201*b* is a client device.

The manager creates an email approving an employee's travel plans on the first communication device 201*a*. The manager's email is represented by the first portion 640 in FIG. 6. At event 601, the first communication device 201*a* generates a signature for the first portion, and at event 602, sends the signed first portion 650 to the employee at the second communication device 201*b*.

The employee on the second communication device 201*b* composes a forwarding email including the manager's emails as well as text outlining the employee's preferred travel itinerary. The preferred travel itinerary text inputted by the employee on the second communication device 201*b* is represented by the second portion 660 in FIG. 6. At event 603, the second communication device 201*b* combines the signed first portion 650 and the second portion 660 to create a complete message.

At event 604, the second communication device generates a signature for the complete message, and at event 620 sends the signed message 680 to the destination 499 e.g. the accounting department. The signed message 680 may be sent to the destination 499 via a messaging server 132 (not shown here).

In the example illustrated by FIG. 6, the first signature allows the accounting department to certify that the manager sent the first portion containing the approval of the travel plans, and that the text of the approval message was not modified; and the second signature allows the accounting department to certify that the employee sent the second portion containing the preferred travel itinerary along with the first portion, and that the text of the preferred travel itinerary and the attached first portion were not modified.

In the examples described herein, the destination 499 may be a server, or other communication device. The destination 499 may include a display for rendering the received message. In some examples, the received message may be rendered with indicators indicating which portions of the message are covered by the first and second signatures. For example, if coloured bars are used to highlight which portions of a message were covered by different signatures, in the scenario illustrated by FIG. 6, the manager's approval text would be highlighted by a first color bar indicating that this text was signed by the manager, and the whole message including both the manager's approval text and the employee's preferred travel itinerary would be highlighted by a second color bar indicating that the entire message was signed by the employee.

In other examples, the signed first portion of the message 450 may be rendered on a destination display as an attachment. In some examples, to view the first portion of the message, a user at the destination may have to manually instruct the destination device to open the attachment containing the first portion. In other examples, the destination device may be configured to automatically open the first portion attachment and display its contents along with the contents of the second portion.

Certain adaptations and modifications of the described embodiments can be made. Therefore, the above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. A method of signing a message, the message for transmission from a first communication device associated with a user to a destination via a server, wherein the message includes a first portion and a second portion, the method comprising:
   receiving at the server the first portion of the message and a first signature for the first portion from the first communication device;
   combining the first portion and the second portion to form the message;
   generating a hash of the message;
   sending the hash to the first communication device;
   receiving a second signature from the first communication device; and
   sending the first signature, the second signature and the message from the server to the destination,
   wherein the first and second signatures are associated with the user of the first communication device.

2. The method of claim 1, wherein the first signature is generated on the first communication device using a device private key different from the second private key.

3. The method of claim 1 wherein
   combining the first portion and the second portion to form the message includes combining the first portion, the second portion and the first signature to form the message; and
   wherein sending includes sending the first signature to the destination within the message.

4. The method of claim 1, wherein combining the first portion and the second portion to form the message includes excluding the first signature from the message.

5. The method of claim 1 wherein the first portion received from the first communication device is encrypted.

6. The method of claim 1 further comprising encrypting the message before obtaining the second signature.

7. The method of claim 1 wherein the message is an email reply or forward of an original message;
   wherein the first portion includes text or attachments selected on the first communication device; and
   wherein the second portion includes text or attachments from the original message.

8. A method of signing a message, the message for transmission from a first communication device associated with a user to a destination via a server, wherein the message includes a first portion and a second portion, the method comprising:
   receiving an indication of a message having the second portion from the server, wherein the second portion is not received;
   generating a first signature for the first portion of the message on the first communication device, the first signature associated with the user of the first communication device;
   sending the first signature and the first portion of the message to the server;
   receiving a hash of the message from the server;
   in response to receiving the hash, generating a second signature using the hash of the message, the second signature associated with the user of the first communication device; and
   sending the second signature to the server.

9. The method of claim 8, wherein the message includes the first portion, the second portion, and the first signature, and wherein the hash has been calculated over the message.

10. The method of claim 8 wherein the message is an email reply or forward of an original message;
    wherein the first portion includes text or attachments selected on the first communication device; and wherein the second portion includes text or attachments from the original message.

11. A server for signing a message, the message for transmission from a communication device associated with a user to a destination via the server, wherein the message includes a first portion and a second portion, the server comprising:
   a processor;
   memory storing the second portion of the message;
   a communication subsystem for sending and receiving communications with the communication device and the destination; and
   computer-executable instructions stored in the memory which, when executed, configure the processor to
   receive the first portion of the message and a first signature for the first portion from the communication device,
   combine the first portion with the second portion to form the message,
   generate a hash of the message;
   send the hash to the communication device;
   receive a second signature from the communication device; and
   send the first signature, the second signature and the message from the server to the destination,
   wherein the first and second signatures are associated with the user of the first communication device.

12. The server of claim 11 wherein the memory stores a server private key, and wherein the processor is configured to obtain the second signature by generating the second signature for the message, and wherein generating includes signing the message using the server private key.

13. The server of claim 12, wherein the first signature received from the first communication device has been generated on the first communication device using a device private key different from the server private key.

14. A communication device associated with a user for signing a message, the message for transmission from the communication device to a destination via a server, wherein the message includes a first portion and a second portion, the communication device comprising:
   a processor;
   a memory storing the first portion;
   a communication subsystem for sending and receiving communications with the server; and
   computer-executable instructions stored in the memory which, when executed, configure the processor to
      receive an indication of a message having a second portion from the server, wherein the second portion is not received;
      generate a first signature for the first portion, the first signature associated with the user of the first communication device,
      send the first signature and the first portion of the message to the server,
      receive a hash of the message from the server,
      in response to receiving the hash, to generate a second signature using the hash of the message, the second signature associated with the user of the first communication device, and
      send the second signature to the server.

* * * * *